(12) United States Patent
Huang et al.

(10) Patent No.: US 12,355,556 B2
(45) Date of Patent: Jul. 8, 2025

(54) CLOCK SYNCHRONIZATION METHOD AND APPARATUS, AND ELECTRONIC DEVICE

(71) Applicant: APUTURE IMAGING INDUSTRIES CO., LTD., Guangdong (CN)

(72) Inventors: Guolin Huang, Guangdong (CN); Chun Zhang, Guangdong (CN)

(73) Assignee: APUTURE IMAGING INDUSTRIES CO., LTD., Shenzhen (CN)

( * ) Notice: Subject to any disclaimer, the term of this patent is extended or adjusted under 35 U.S.C. 154(b) by 505 days.

(21) Appl. No.: 17/889,468

(22) Filed: Aug. 17, 2022

(65) Prior Publication Data

US 2023/0188239 A1 Jun. 15, 2023

(30) Foreign Application Priority Data

Dec. 9, 2021 (CN) .......................... 202111495706.6

(51) Int. Cl.
*H04J 3/06* (2006.01)
*H04L 1/08* (2006.01)
*H04L 43/106* (2022.01)
*H04L 43/16* (2022.01)

(52) U.S. Cl.
CPC .......... *H04J 3/0697* (2013.01); *H04J 3/0667* (2013.01); *H04L 1/08* (2013.01); *H04L 43/106* (2013.01); *H04L 43/16* (2013.01)

(58) Field of Classification Search
CPC ...... H04J 3/0697; H04J 3/0667; H04J 3/0664; H04J 3/0682; H04L 1/08; H04L 43/106; H04L 43/16; H04L 43/0852; G06F 1/12; G06F 1/14

USPC .......................................................... 370/350
See application file for complete search history.

(56) References Cited

U.S. PATENT DOCUMENTS

| | | | | |
|---|---|---|---|---|
| 2014/0237107 | A1* | 8/2014 | Ince | H04L 69/40 709/224 |
| 2023/0125350 | A1* | 4/2023 | Zhang | H04N 21/2407 725/14 |

FOREIGN PATENT DOCUMENTS

CN        105634865 A  *  6/2016  ......... H04L 43/0888

* cited by examiner

Primary Examiner — Rownak Islam

(57) ABSTRACT

The present invention disclose a clock synchronization method. By the operations of: receiving a plurality of data packets sent by a host and acquiring receiving time when each data packet is received and a sending interval at which each two adjacent data packets are sent, wherein each data packet comprises a packet sequence and a first packet timestamp when the first data packet is sent; carrying out screening processing on all data packets according to the sending interval and the receiving time and packet sequence of each data packet so as to obtain at least one valid data packet; obtaining a time compensation value according to the receiving time and packet sequence of each valid data packet, the first packet timestamp, and the sending interval; and adjusting time of a slave according to the time compensation value so as to realize clock synchronization between the slave and the host.

19 Claims, 8 Drawing Sheets

CLOCK SYNCHRONIZATION METHOD AND APPARATUS, AND ELECTRONIC DEVICE

CROSS REFERENCE TO RELATED APPLICATIONS

The present application claims the benefit of Chinese Patent Application No. 202111495706.6 filed on Dec. 9, 2021, the contents of which are incorporated herein by reference in their entirety.

FIELD OF THE INVENTION

The present invention relates to the technical field of wireless communication, and particularly relates to a clock synchronization method and apparatus, an electronic device, and a readable storage medium.

BACKGROUND OF THE INVENTION

Clock synchronization of wireless devices has very important significance in the actual production and life. For example, in scenes of a film crew, variety show shooting, and the like, videos and audios are often separately processed, so in order to make post-editing more convenient, it is often necessary to equip machines such as a video camera and a sound recorder with a time coder device, which can work by calculating the exact number of frames from the first video to the last video as a method of accurately marking a video frame in the shooting process. When the frames are counted, a time code allocates one unique identifier to each frame, and each frame comprises: a value of hour:minute:second:frame.

However, there are often multiple video cameras and sound recorders in the same crew and time code information of multiple machines needs to be synchronized. Manually setting the same time code information for all devices will generate a relatively large error, and is also relatively high in workload. Another mode is that clock synchronization is carried out via a wireless network, such mode generally adopts a Network Time Protocol (NTP), the clock synchronization accuracy of the NTP is often related to the network condition between an NTP server and a user, and when a round-trip route of an NTP packet is asymmetric or occasional network delay fluctuation occurs, it will cause a relatively large error of clock synchronization.

SUMMARY OF INVENTION

Based on the research above, the present invention provides a clock synchronization method and apparatus, and an electronic device so as to improve the problems above.

Embodiments of the present invention can be implemented by the following aspects:

In the first aspect, an embodiment of the present invention provides a clock synchronization method, comprising:
receiving a plurality of data packets sent by a host and acquiring receiving time when each data packet is received and a sending interval at which each two adjacent data packets are sent, wherein the data packet comprises a packet sequence and a first packet timestamp when the first data packet is sent;
carrying out screening processing on all data packets according to the sending interval and the receiving time and packet sequence of each data packet so as to obtain at least one valid data packet;
obtaining a time compensation value according to the first packet timestamp, the sending interval, and the receiving time and packet sequence of each valid data packet; and
adjusting time of a slave according to the time compensation value so as to realize clock synchronization between the slave and the host.

As an optional technical solution, the step of carrying out screening processing on all data packets according to the sending interval and the receiving time and packet sequence of each data packet so as to obtain at least one valid data packet comprises:
obtaining a first delay between other data packets and each data packet according to the sending interval and the packet sequence and receiving time of the data packet;
obtaining target data packets in conformity with a preset delay threshold in other data packets according to the first delay; and
detecting whether a proportion of the number of the target data packets is greater than a preset proportion threshold, and if yes, setting the data packet as a valid data packet.

As an optional technical solution, the step of obtaining a first delay between other data packets and each data packet according to the sending interval and the packet sequence and receiving time of the data packet comprises:
obtaining the first delay between other data packets and the data packet by calculation using the following formula according to the sending interval and the packet sequence and receiving time of the data packet:

$$d_i = t_i - t_r - \Delta T(i-1),$$

wherein i represents a packet sequence of the $i^{th}$ data packet, $d_i$ represents a first delay of the data packet with the packet sequence of i, $t_i$ represents receiving time of the data packet with the packet sequence of i, $t_r$ represents receiving time of a data packet with a packet sequence of r, $\Delta T$ represents the sending interval, and the sending interval between any two adjacent data packets is equal.

As an optional technical solution, the step of obtaining target data packets in conformity with a preset delay threshold in other data packets according to the first delay comprises:
comparing an absolute value of each first delay with the delay threshold; and
setting a data packet corresponding to the first delay as the target data packet if the absolute value of the first delay is smaller than the delay threshold.

As an optional technical solution, the step of obtaining a time compensation value according to the first packet timestamp, the sending interval, and the receiving time and packet sequence of each valid data packet comprises:
obtaining a clock difference according to the sending interval, the first packet timestamp, and the receiving time and packet sequence of each valid data packet; and
obtaining the time compensation value according to the clock differences of all valid data packets.

As an optional technical solution, the step of obtaining a clock difference according to the sending interval, the first packet timestamp, and the packet sequence and receiving time of each valid data packet comprises:
obtaining the clock difference by calculation using the following formula according to the sending interval, the first packet timestamp, and the packet sequence and receiving time of the valid data packet:

$$\Delta C_i = t_i - \Delta T(i-1) - T_0 - D,$$

wherein i represents the packet sequence of the $i^{th}$ data packet, $\Delta C_i$ represents a clock difference of the data packet with the packet sequence of i, $t_i$ represents the receiving time of the data packet with the packet sequence of i, $T_0$ represents the first packet timestamp, D represents a standard delay, $\Delta T$ represents the sending interval, and the sending interval between any two adjacent data packets is equal.

As an optional technical solution, the step of obtaining the time compensation value according to the clock differences of all valid data packets comprises:

obtaining a compensation index according to the clock differences of all valid data packets and setting the compensation index as the time compensation value, wherein the compensation index is an average value of all clock differences.

Wherein after time of the slave is adjusted, adjusted time of the slave is obtained so as to realize clock synchronization between the slave and the host; and the adjusted time of the slave is obtained using the following formula:

$$C = T_0 + \Delta T(n-1) + \Delta C_{average} + D,$$

wherein C represents the adjusted time of the slave, $T_0$ represents the first packet timestamp, D represents the preset standard delay, $\Delta T$ represents the sending interval, $\Delta C_{average}$ represents the average value of all clock differences, and n represents the number of the data packets.

As an optional technical solution, after the time is adjusted according to the time compensation value, the method further comprises:

sending an acknowledgement data packet to the host, so that the host resends a plurality of data packets according to the acknowledgement data packet after a preset duration.

In the second aspect, an embodiment of the present invention provides a clock synchronization apparatus, comprising:

a data receiving module, used for receiving a plurality of data packets sent by a host and acquiring receiving time when each data packet is received and a sending interval at which each two adjacent data packets are sent, wherein the data packet comprises a packet sequence and a first data packet timestamp when the first data packet is sent;

a screening processing module, used for carrying out screening processing on all data packets according to the sending interval and the receiving time and packet sequence of each data packet so as to obtain at least one valid data packet and obtaining a time compensation value according to the first packet timestamp, the sending interval, and the receiving time and packet sequence of each valid data packet; and a clock synchronization module, used for adjusting time of a slave according to the time compensation value so as to realize clock synchronization between the slave and the host.

In the third aspect, an embodiment of the present invention provides an electronic device, comprising: a memory, a processor, and a computer program stored in the memory and capable of running on the processor, wherein the processor, when executing the computer program, implements the above-mentioned clock synchronization method.

In the fourth aspect, an embodiment of the present invention provides a readable storage medium storing a computer program, wherein the computer program, when executed by a processor, implements the above-mentioned clock synchronization method.

According to the clock synchronization method and apparatus, the electronic device, and the readable storage medium provided by the embodiments of the present invention, by the operations of: receiving a plurality of data packets sent by the host and acquiring the receiving time when each data packet is received and the sending interval at which each two adjacent data packets are sent, wherein the data packet comprises the packet sequence and the first packet timestamp when the first data packet is sent; carrying out screening processing on all data packets according to the sending interval and the receiving time and packet sequence of each data packet so as to obtain at least one valid data packet; obtaining the time compensation value according to the receiving time of each valid data packet, the first packet timestamp, and the sending interval; and adjusting the time of the slave according to the time compensation value so as to realize clock synchronization between the slave and the host, the influence of occasionality of network delay fluctuation on the accuracy of a clock synchronization result is greatly reduced, and the accuracy of clock synchronization is improved.

BRIEF DESCRIPTION OF THE DRAWINGS

In order to more clearly illustrate the technical solution of the embodiments of the present invention, the drawings which need to be used in the description of the embodiments will be briefly introduced below. It is obvious that the described drawings are only related to some embodiments of the present invention, and those skilled in the art can also obtain other drawings from these drawings without any inventive work.

Figure 1:
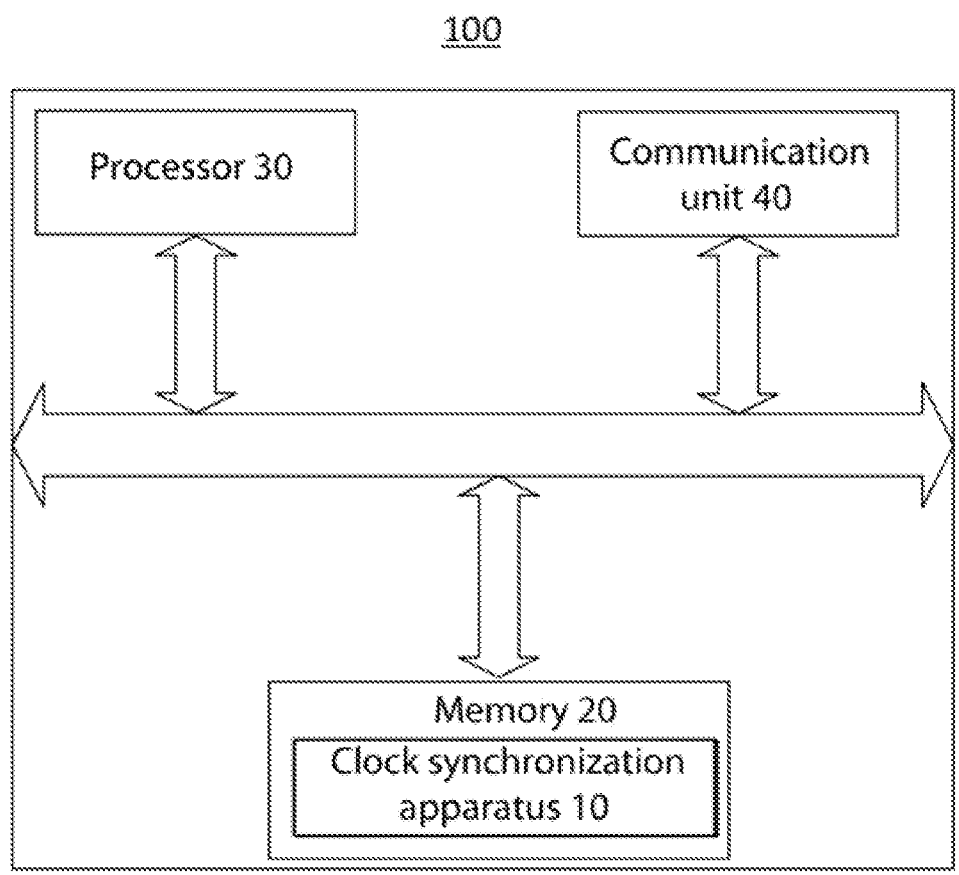
FIG. 1 is a structural schematic diagram of an electronic device provided by embodiments of the present invention.

Reference Signs: 100—electronic device; 10—clock synchronization apparatus; 11—data receiving module; 12—screening processing module; 13—clock synchronization module; 20—memory; 30—processor; and 40—communication unit.

DETAILED DESCRIPTION OF ILLUSTRATED EMBODIMENTS

In order to make objects, technical solutions and advantages of the embodiments of the present invention clearer, the technical solutions of the embodiments of the present invention will be described more clearly and completely in conjunction with the drawings in the embodiments of the present invention. It is obvious that the described embodiments are just a part but not all of the embodiments of the present invention. Generally, components of the embodiments of the present invention described and shown in the drawings herein can be arranged and designed by various different configurations.

Therefore, the detailed description on the embodiments of the present invention provided in the drawings are not intended to limit the claimed scope of the present invention, but just represents the selected embodiments of the present invention. All other embodiments obtained by those of ordinary skill in the art based on the embodiments in the present invention without any inventive work fall within the scope of protection of the present invention.

It should be noted that similar reference signs and letters represent similar items in the following drawings, and thus, once a certain item is defined in one drawing, it does not need to be further defined and explained in the subsequent drawings.

In the description of the present invention, it also should be illustrated that unless expressly stipulated or defined, terms "arranging", "mounting", "connected", and "connection" should be understood in a broad sense, for example, connection can be fixed connection, detachable connection, or integrated connection; connection can be mechanical connection or electric connection; connection can be direct connection or indirect connection through an intermediate medium, or the internal communication between two elements. Those of ordinary skill in the art can understand specific meanings of the terms in the present invention according to specific conditions.

Clock synchronization of wireless devices has very important significance in the actual production and life. For example, in conventional scenes of a film crew, variety show shooting, and the like, it is often necessary to equip machines such as a video camera and a sound recorder with a time coder device, but there are often multiple video cameras and sound recorders in the same crew and time code information of multiple machines needs to be synchronized. Commonly, clock synchronization is carried out via a wireless network, such mode generally adopts an NTP, the clock synchronization accuracy of the NTP is often related to the network condition between an NTP server and a user, and when a round-trip route of an NTP packet is asymmetric or occasional network delay fluctuation occurs, it will cause a relatively large error of clock synchronization.

Based on the research above, this embodiment provides a clock synchronization method. The method comprises: receiving a plurality of data packets sent by a host and acquiring receiving time when each data packet is received and a sending interval at which each two adjacent data packets are sent, wherein the data packet comprises a packet sequence and a first packet timestamp when the first data packet is sent; carrying out screening processing on all data packets according to the sending interval and the receiving time and packet sequence of each data packet so as to obtain at least one valid data packet; obtaining a time compensation value according to the receiving time and packet sequence of each valid data packet, the first packet timestamp, and the sending interval; and adjusting time of a slave according to the time compensation value so as to realize clock synchronization between the slave and the host. The influence of occasionality of network delay fluctuation on the accuracy of a clock synchronization result is greatly reduced, and the accuracy of clock synchronization is improved.

With reference to FIG. 1, FIG. 1 is a structural block diagram of an electronic device 100 provided by this embodiment. As shown in FIG. 1, the electronic device can comprise a clock synchronization apparatus 10, a memory 20, a processor 30, and a communication unit 40, wherein the memory 20 stores a machine readable instruction capable of being executed by the processor 30, and when the electronic device 100 runs, the processor 30 communicates with the memory 20 through a bus, and the processor 30 executes the machine readable instruction, and executes the clock synchronization method.

Various components, such as the memory 20, the processor 30, and the communication unit 40, are directly or indirectly electrically connected with each other so as to implement transmission and interaction of signals. For example, electrical connection between every two of these components can be implemented through one or more communication buses or signal lines. The clock synchronization apparatus 10 comprises at least one software functional module capable of being stored in the memory 20 in a software or firmware form. The processor 30 is used for executing an executable module (for example, the software functional module included in the clock synchronization apparatus 10 or a computer program) stored in the memory 20.

Wherein the memory can be, but is not limited to, a random access memory (RAM), a read only memory (ROM), a programmable read-only memory (PROM), an erasable programmable read-only memory (EPROM), an electric erasable programmable read-only memory (EEPROM), and the like.

In some embodiments, the processor 30 is used for executing one or more functions described in this embodiment. In some embodiments, the processor 30 can comprise one or more processing cores (for example, a single-core processor (S) or a multi-core processor (S)). Just as an example, the processor 30 can comprise a central processing unit (CPU), an application specific integrated circuit (ASIC), an application specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction set computing (RISC) or a microprocessor, and the like, or any combination thereof.

In order to facilitate illustration, only one processor is described in the electronic device 100. However, it should be noted that the electronic device 100 in this embodiment can also comprise a plurality of processors, so the steps executed by one processor described in this embodiment can also be executed jointly or separately by a plurality of processors. For example, if a processor of a server executes step A and step B, it should be understood that step A and step B can also be executed jointly by two different processors or separately executed in one processor. For example, a processor executes step A and a second processor executes step B, or the processor and the second processor jointly execute steps A and B.

In this embodiment, the memory 20 is used for storing a program, and the processor 30 is used for executing the program after receiving an execution instruction. A method defined by flow disclosed by any one implementation mode of this embodiment can be applied to the processor 30, or implemented by the processor 30.

The communication unit 40 is used for establishing communication connection between the electronic device 100 and other devices through a network and used for sending and receiving data through the network.

In some implementation modes, the network can be any type of wired or wireless network, or a combination thereof. Just as an example, the network can comprise a wired network, a wireless network, a fiber-optic network, a remote communication network, an intranet, the Internet, a local area network (LAN), a wide area network (WAN), wireless local area networks (WLAN), a metropolitan area network (MAN), a wide area network (WAN), a public switched telephone network (PSTN), a Bluetooth network, a ZigBee network, or a near field communication (NFC) network, and the like, or any combination thereof.

In this embodiment, the electronic device 100 can be, but is not limited to, a notebook computer, an ultra-mobile personal computer (UMPC), a netbook, a personal digital assistant (PDA), and the like, and this embodiment does not make any limit to the specific type of the electronic device.

It should be understood that the structure shown in FIG. 1 is merely schematic. The electronic device 100 can also be provided with more or fewer components than those shown in FIG. 1, or have a different configuration from that shown in FIG. 1. Each component shown in FIG. 1 can be implemented by hardware, software or a combination thereof.

Figure 2:
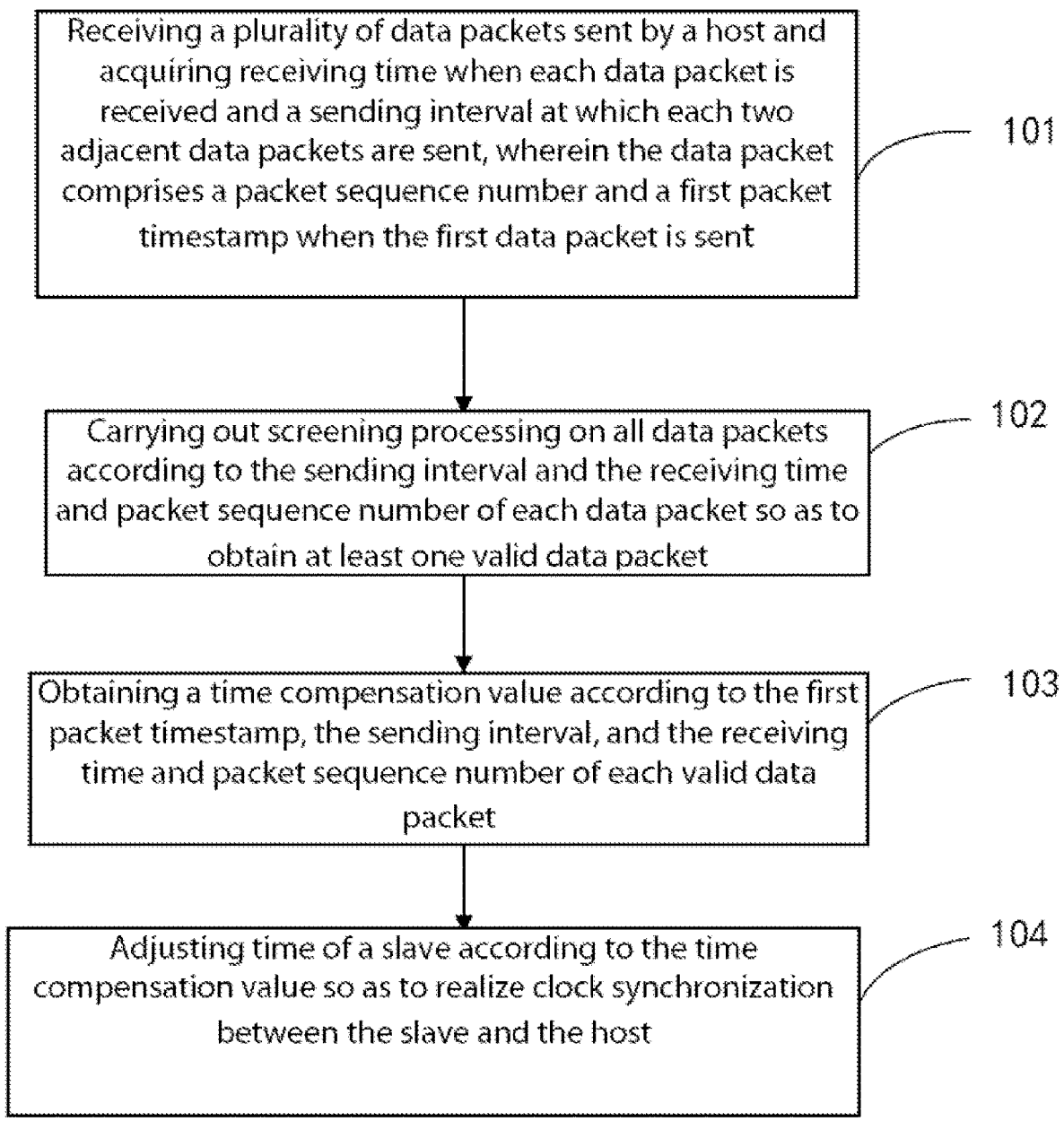
FIG. 2 is a flowchart of a clock synchronization method provided by embodiments of the present invention.

Based on the implementation architecture of FIG. 1, this embodiment provides a clock synchronization method executed by the electronic device shown in FIG. 1. The steps of the clock synchronization method provided by this embodiment will be illustrated in detail below based on the structural diagram of the electronic device 100 shown in FIG. 1. In combination with FIG. 2, the clock synchronization method comprises S101 to S104:

S101: receiving a plurality of data packets sent by a host and acquiring receiving time when each data packet is received and a sending interval at which each two adjacent data packets are sent, wherein the data packet comprises a packet sequence and a first packet timestamp when the first data packet is sent.

Figure 3:
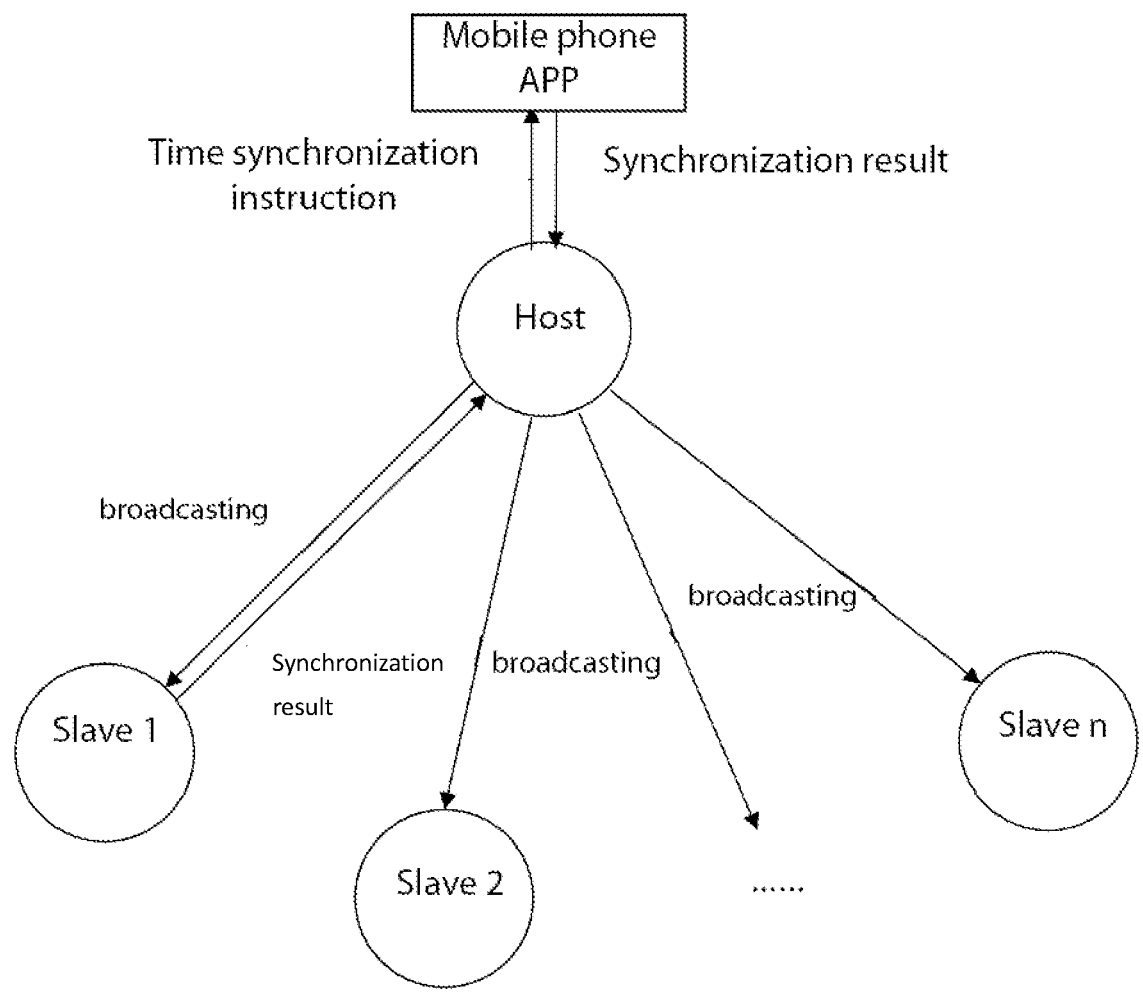
FIG. 3 is a schematic diagram of application of clock synchronization provided by embodiments of the present invention.
Figure 4:
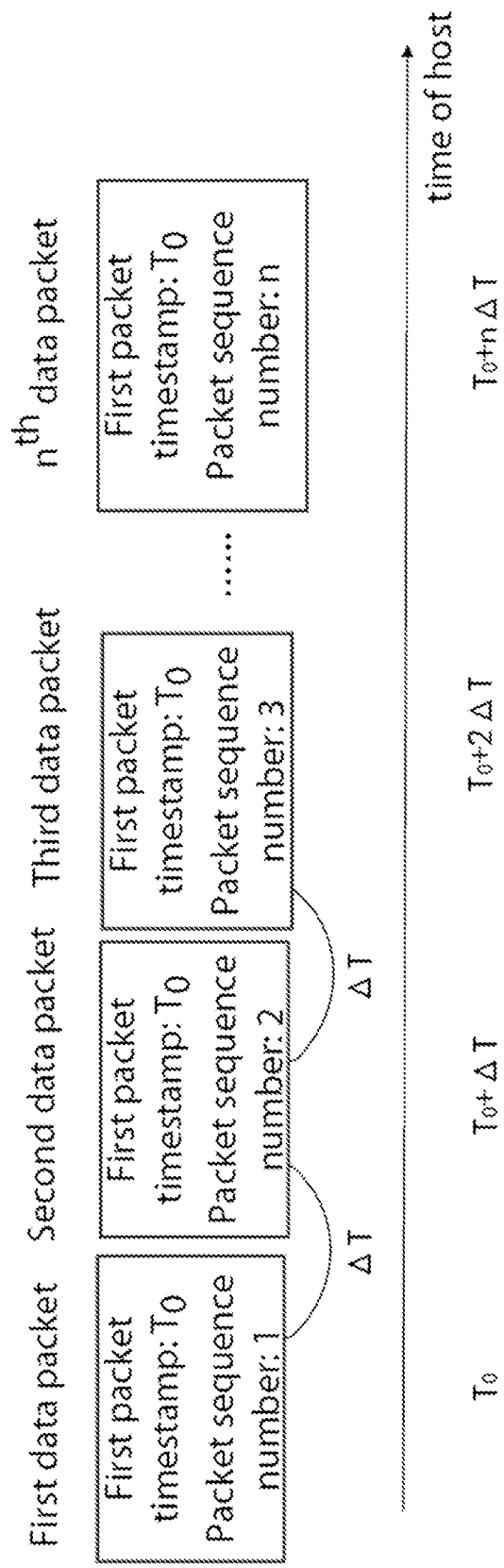
FIG. 4 is a schematic diagram of a host sending a plurality of data packets provided by embodiments of the present invention.
Figure 5:
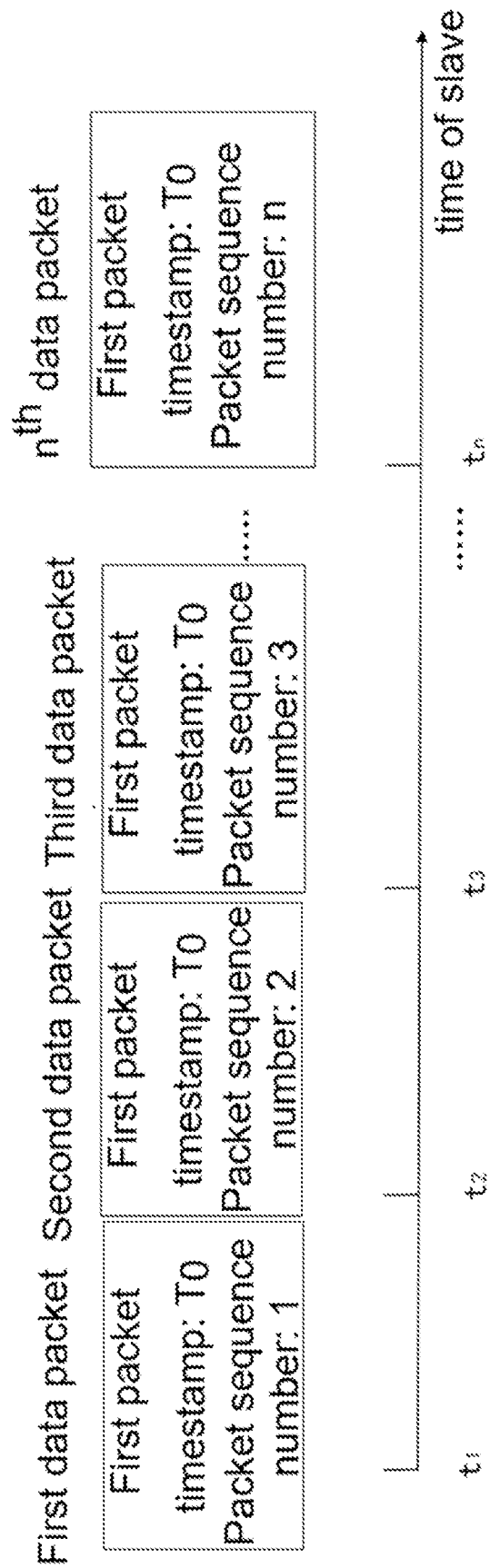
FIG. 5 is a schematic diagram of a slave receiving a plurality of data packets provided by embodiments of the present invention.

In combination with FIG. 3, it should be understood that in this embodiment, there is at least one host, the host can be a specific device designated in a wireless network, e.g., a time server. The host can send a plurality of data packets to other electronic devices in a certain period of time, e.g., 3 milliseconds or 5 milliseconds, other electronic devices can be slaves, time clients, and the like, and the sending mode can be a broadcasting mode. In the practical application, a time synchronization instruction can also be sent to the host through a mobile phone APP, and the host sends a plurality of data packets to the slave after receiving the time synchronization instruction, and sends a synchronization result to the mobile phone APP after synchronization is completed.

Wherein in combination with FIG. 4 and FIG. 5, the data packet at least comprises the packet sequence and the first packet timestamp when the first data packet is sent. It should be explained that the packet sequence can be the serial number set on the to-be-sent data packet by the host, and each packet sequence corresponds to one data packet. If the host sends n data packets, there are n packet sequences in total, a packet sequence of the first data packet sent is 1, a packet sequence of the second data packet is 2, and so on, then a packet sequence of the $n^{th}$ data packet is n. It is easy to understand that the first packet timestamp is time of host when the host sends the first data packet, and corresponds to $T_0$ in FIG. 4. The slave can refer to time per se when receiving each data packet, and generates corresponding receiving time according to the received data packet, and the receiving time corresponds to $t_1, t_2 \ldots t_n$ in FIG. 5. It should be noted that the sending time of each data packet is different from the sending time of other data packets, in other words, a time interval exists when two adjacent data packets are sent, and the time interval corresponds to $\Delta T$ in FIG. 4. In this embodiment, the time intervals can be different, or can be the same, this embodiment does not make any limit to it, but in order to facilitate calculation and implementation, the time interval between two adjacent data packets is set to be the same.

S102: carrying out screening processing on all data packets according to the sending interval and the receiving time and packet sequence of each data packet so as to obtain at least one valid data packet.

Wherein after the sending interval and the receiving time and packet sequence of each data packet are acquired, data packets which are not in conformity with the screening condition are eliminated by carrying out screening processing on all the data packets so as to obtain at least one valid data packet. In order to facilitate understanding and implementation by those skilled in the art, this embodiment carries out illustration on the implementation modes of screening processing, and the details are as follows:

The slave generates the receiving time of each data packet when receiving each data packet, and calculates the receiving time interval between two adjacent data packets according to the receiving time of each data packet. Except for the first received data packet, for other data packets, a time interval between each of other data packets and a previous data packet is compared with a preset interval threshold, and if the time interval is smaller than the interval threshold, it is determined that the data packet is the valid data packet; or it can be that a time interval between each of other data packets and a data packet with an interval of two packet sequences is calculated, the time interval is compared with a preset interval threshold, and if the time interval is smaller than the interval threshold, it is determined that the data packet is the valid data packet. It should be noted that values of the interval thresholds in the two implementation modes are different.

S103: obtaining a time compensation value according to the receiving time and packet sequence of each valid data packet, the first packet timestamp, and the sending interval.

Wherein the time compensation value is used for adjusting time of the slave, after the time of the slave is adjusted according to the time compensation value, the time of the slave is closer to time of the host, that is to say, the time of the host and the time of the slave are kept synchronous and consistent. In this embodiment, the time compensation value is obtained by acquiring the receiving time of each valid data packet, the first packet timestamp, and the sending interval and processing the receiving time of each valid data packet, the first packet timestamp, and the sending interval.

The common processing mode can be that clock differences are obtained according to the receiving time of the valid data packets, the first packet timestamp, and the sending interval, the obtained clock differences are compared with a preset clock difference threshold, clock differences smaller than the clock difference threshold are retained, absolute values of the retained clock differences are arranged according to the size, and a median of all the clock differences is selected as the time compensation value.

S104: adjusting time of a slave according to the time compensation value so as to realize clock synchronization between the slave and the host.

Wherein due to the reasons of network transmission and the like, the time of the slave and the time of the host have inconsistency, but in the practical use, it is often required that the time of the slave and the time of the host are synchronous to the greatest extent. In this embodiment, in order to make up time inconsistency between the slave and the host and reduce a clock error between the slave and the host to the greatest extent, the time compensation value is obtained by processing and calculation, and the time of the slave is adjusted by the slave according to the time compensation value so as to realize clock synchronization between the slave and the host.

According to the clock synchronization method provided by the embodiment of the present invention, after a plurality of data packets sent by the host are received, the receiving time when each data packet is received and the sending interval at which each two adjacent data packets are sent are acquired. The data packet comprises the packet sequence and the first packet timestamp when the first data packet is sent. Screening processing is carried out on all data packets according to the sending interval and the receiving time and packet sequence of each data packet so as to obtain at least one valid data packet. The time compensation value is obtained according to the receiving time of each valid data packet, the first packet timestamp, and the sending interval. The time of the slave is adjusted according to the time compensation value so as to realize clock synchronization between the slave and the host. The influence of occasionality of network delay fluctuation on the accuracy of a clock synchronization result is greatly reduced, and the accuracy of clock synchronization is improved.

Figure 6:
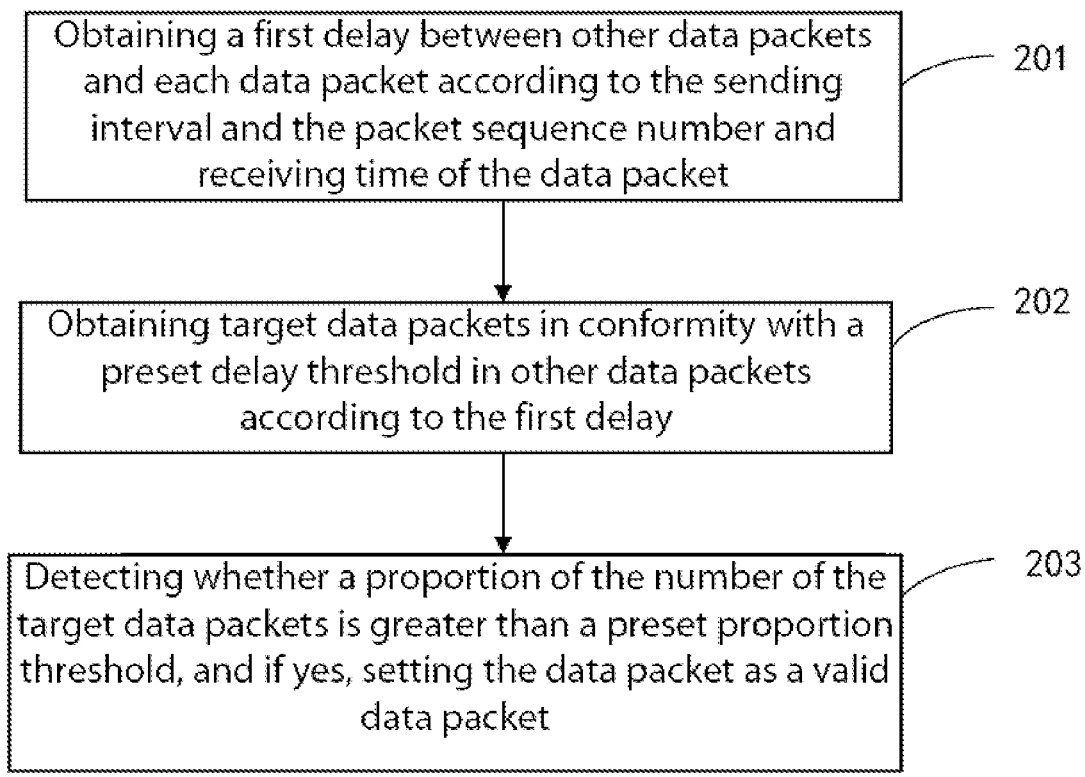
FIG. 6 is a flowchart of obtaining a valid data packet provided by embodiments of the present invention.

In consideration of occasionality of network delay fluctuation, it is inevitable to cause a case that a small part of some data packets received by the slave have relatively large delay deviations. In order to avoid the influence of this part of data packets with the relatively large delay deviations on clock synchronization, in some optional embodiments, in combination with FIG. 6, the step of carrying out screening processing on all data packets according to the sending interval and the receiving time and packet sequence of each data packet so as to obtain at least one valid data packet comprises:

S201: obtaining a first delay between other data packets and each data packet according to the sending interval and the packet sequence and receiving time of the data packet;

S202: obtaining target data packets in conformity with a preset delay threshold in other data packets according to the first delay; and S203: detecting whether a proportion of the number of the target data packets is greater than a preset proportion threshold, and if yes, setting the data packet as a valid data packet.

It is easy to understand that time when the host sends the data packets and time when the slave receives the data packets often have inconsistency, and reasons causing such inconsistency mainly comprise a wireless network standard delay, occasional network delay fluctuation, and the clock difference between the slave and the host. In the practical application, the standard delay of the wireless network composed of the host and the slave can be measured and calculated; in this embodiment, by experiment measurement and calculation, it can be obtained that the standard delay can generally be 44 milliseconds; and certainly, in other embodiments, the standard delay can also be set as other values as required. Actual delays of most of data packets received by the slave can fluctuate within a neighbor interval of the standard delay.

When clock synchronization is started, the first delay between other data packets and each data packet received by the slave is calculated, and it should be illustrated that when the slave receives the data packets sent by the host, there may be a case of data packet loss. In other words, in some cases, the host sends 20 data packets to the slave, but the slave only receives 18 data packets, so 2 data packets are lost. If the loss case occurs, the data packet comprises the packet sequence, so the slave can still carry out processing according to the actually received data packets, and the lost data packets do not influence the subsequent calculation processing.

In this embodiment, after the target data packets are acquired, it is detected whether the proportion of the number of the target data packets is greater than the preset proportion threshold, and if the proportion of the number of the target data packets is greater than the proportion threshold, the data packet is set as a valid data packet.

In an optional implementation mode, a proportion of the number of target data packets of a data packet with a packet sequence of i can be obtained using the following formula:

$$p_i = \frac{m_i}{n-1} * 100\%,$$

wherein $p_i$ represents the proportion of the number of the target data packets of the data packet, $m_i$ represents the number of the target data packets of the data packet, and n represents the number of data packets.

For example, there are 100 data packets, and for a data packet with a packet sequence of 2, in other data packets, there are 85 target data packets in conformity with the delay threshold, and then it can be obtained by calculation using the above formula that a proportion of the number of the target data packets of the data packet is 85.8%.

It should be explained that the selected delay threshold may influence the preset proportion threshold. Particularly, in addition to the influence of occasional delay fluctuation, actual delays of most of the data packets fluctuate in a certain range of the standard delay, for example, the delay threshold is half of the standard delay, and according to experiment measurement and calculation, it can be obtained that the proportion of the data packets in conformity with the range of half of the standard delay is about 80% to 90%. If it is determined that the data packet is the valid data packet after calculation, it is indicated that the data packet is not influenced by occasional network delay fluctuation, and if the proportion is smaller than the proportion threshold, it is indicated that the delay deviation of the data packet is relatively large and the data packet needs to be eliminated.

In addition, when a first delay is calculated, a receiving delay of each data packet will be calculated once as the standard delay, and the target data packets in conformity with the preset delay threshold in other data packets are obtained according to the first delay.

Figure 7:
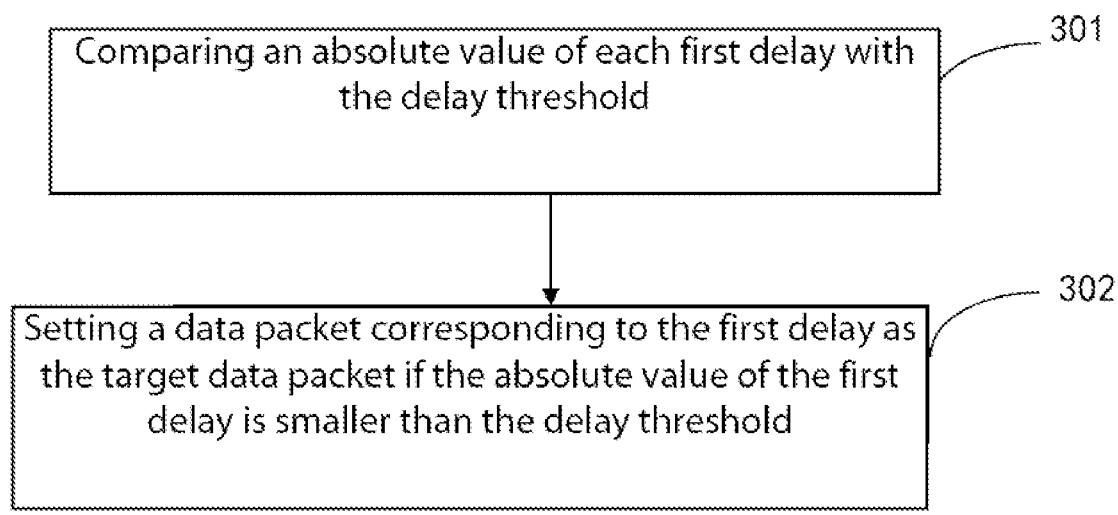
FIG. 7 is a flowchart of obtaining a target data packet provided by embodiments of the present invention.

In an optional embodiment, in combination with FIG. 7, the step of obtaining the target data packets in conformity with the preset delay threshold in other data packets according to the first delay comprises:

S301: comparing an absolute value of each first delay with the delay threshold; and S302: setting a data packet corresponding to the first delay as the target data packet if the absolute value of the first delay is smaller than the delay threshold.

Wherein the delay threshold can be a numerical value or a certain interval, for example, the delay threshold is half of the standard delay, and for example, if the standard delay is 44 milliseconds, the delay threshold is 22 milliseconds, i.e., the absolute value of the first delay needs to meet a set value and the absolute value of the first delay is smaller than half of the standard delay. In other words, for example, by taking a case that the standard delay is 44 milliseconds as an example, if the absolute value of the first delay is smaller than 22 milliseconds, it is determined that the data packet corresponding to the first delay is the target data packet; and if the absolute value of the first delay is greater than 22 milliseconds, it is determined that the data packet corresponding to the first delay is not the target data packet.

Specifically, the first delay between other data packets and the data packet can be obtained by calculation using the following formula according to the sending interval and the packet sequence and receiving time of the data packet:

$$d_i = t_i - t_r - \Delta T(i-1),$$

wherein i represents a packet sequence of the $i^{th}$ data packet, $d_i$ represents a first delay of the data packet with the packet sequence of i, $t_i$ represents receiving time of the data packet with the packet sequence of i, $t_r$ represents receiving time of a data packet with a packet sequence of r, $\Delta T$ represents the sending interval, it should be noted that the sending interval between any two adjacent data packets is equal, $d_i$ corresponds to the first delay of other data packets with the packet sequence of i, in other words, i corresponds to the packet sequence of other data packets in the formula, and r corresponds to the packet sequence of the data packet in the formula.

In this embodiment, in order to facilitate understanding and implementation by those skilled in the art, this embodiment gives the following specific instances with respect to the valid data packet for illustration.

Specifically, it is assumed that the host sends 20 data packets to the slave, the sending interval is 1 millisecond, the standard delay is 44 milliseconds, the slave receives 19 data packets, and a data packet with a packet sequence of 18 is lost. Now, the first data packet received by the slave is taken as the reference, the packet sequence of the first data packet is 1, a first packet timestamp is 2021-1-1 12:00, and receiving time is 2021-1-1 12:00:00:50. For a data packet with a packet sequence of 4, receiving time of the slave is 2021-1-1 12:00:00:55, and it is calculated that a first delay of the data packet with the packet sequence of 4 is that:

$$d_4 = t_4 - t_1 - \Delta T(4-1).$$

It can be obtained by calculation using the above formula that the first delay $d_4$ of the data packet with the packet sequence of 4 is 2 milliseconds. Assuming that the delay threshold is within a range of 0 to 22 milliseconds and the preset proportion threshold is 80%, the data packet with the packet sequence of 4 is the target data packet. According to this method, the first delays of the other 17 data packets are calculated. Assuming that the absolute values of the calculated first delays of 15 data packets are all within the range of the delay threshold, the proportion of the number of the target data packets is about 89.47% and greater than the preset proportion threshold, so the data packet with the packet sequence of 1 is set as the valid data packet.

Figure 8:
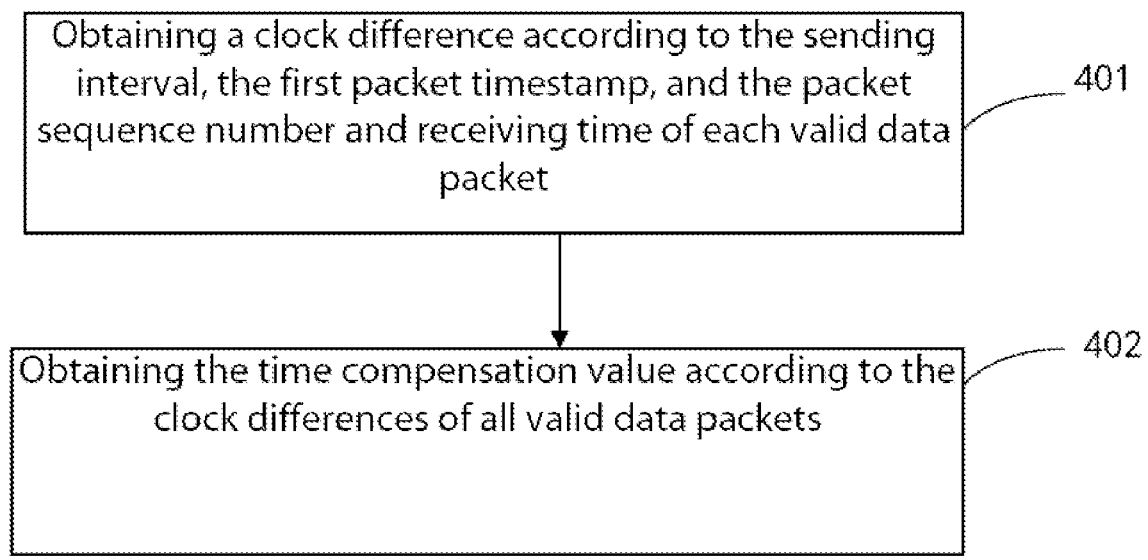
FIG. 8 is a flowchart of obtaining a time compensation value provided by embodiments of the present invention.

Screening out valid data packets from the data packets is the premise of calculating the time compensation value, and it can be known from the above-mentioned content that after the valid data packets are acquired, in some optional embodiments, in combination with FIG. 8, the step of obtaining the time compensation value according to the receiving time and packet sequence of each valid data packet, the first packet timestamp, and the sending interval comprises:

S401: obtaining a clock difference according to the sending interval, the first packet timestamp, and the packet sequence and receiving time of each valid data packet; and S402: obtaining the time compensation value according to the clock differences of all valid data packets.

Wherein the clock difference is calculated once for each valid data packet, and specifically, for each valid data packet, the clock difference is obtained according to the sending interval, the first packet timestamp, and the packet sequence and receiving time of the valid data packet. In this embodiment, the clock difference refers to a difference between the time of the slave and the time of the host.

In some optional embodiments, the step of obtaining the clock difference according to the sending interval, the first packet timestamp, and the packet sequence and receiving time of each valid data packet comprises:

obtaining the clock difference by calculation using the following formula according to the sending interval, the first packet timestamp, and the packet sequence and receiving time of the valid data packet:

$$\Delta C_i = t_i - \Delta T(i-1) - T_0 - D,$$

wherein i represents the packet sequence of the $i^{th}$ data packet, $\Delta C_i$ represents a clock difference of the data packet with the packet sequence of i, $t_i$ represents the receiving time of the data packet with the packet sequence of i, $T_0$ represents the first packet timestamp, D represents the preset standard delay, and $\Delta T$ represents the sending interval. It should be noted that the sending interval between any two adjacent data packets is equal, and i corresponds to the packet sequence of the data packet in the formula.

It should be illustrated that by carrying out screening processing on the data packets, some data packets with the relatively large delay deviations are eliminated, and the remaining data packets are the valid data packets, so the packet sequences of these valid data packets are not necessarily continuous numerical values, and in other words, the value of i may be not a continuous numerical value.

In this embodiment, it is easy to understand that according to the above formula, the clock difference of each valid data packet can be obtained, in order to make the time compensation value more accurate, these clock differences can be further processed, and specifically, the step of obtaining the time compensation value according to the clock differences of all valid data packets comprises:

obtaining a compensation index according to the clock differences of all valid data packets and setting the compensation index as the time compensation value, wherein the compensation index is an average value or a mode of the clock differences.

It should be illustrated that even though the data packets with the relatively large delay deviations are eliminated, the number of the remaining valid data packets is also enough to meet the calculation demand. In general case, the number of the data packets with the relatively large delay deviations is small, in addition, there may also be some lost data packets, and even though in this case, there will still be a certain number of valid data packets. The corresponding clock differences are calculated according to these valid data packets.

In an optional implementation mode, an average value of the clock differences of all the valid data packets is calculated, and the average value is used as the compensation index. The average value of the clock differences of all the valid data packets is obtained by calculation using the following formula:

$$\Delta C_{average} = \frac{\Delta C_1 + \Delta C_2 + \ldots + \Delta C_k}{k},$$

wherein $\Delta C_{average}$ represents the average value of the clock differences of all the valid data packets, $\Delta C_1$ represents a clock difference of the first valid data packet, $\Delta C_2$ represents a clock difference of the second valid data packet, $\Delta C_k$ represents a clock difference of the $k^{th}$ valid data packet, and k represents the number of the valid data packets.

It should be illustrated that the data packets with the relatively large delay deviations are eliminated, so the packet sequences of all the valid data packets are discontinuous in numerical value, resulting in that a serial number of the clock difference of each valid data packet is not necessarily the same with the packet sequence of the valid data packet. For example, the data packet with the packet sequence of 1 has the relatively large delay deviation, thus being eliminated. The data packet with the packet sequence of 2 is the valid data packet by calculation, and then the clock difference of the data packet with the packet sequence of 2 is used as the clock difference of the first valid data packet.

In another optional implementation mode, a mode of all the clock differences is taken, and the mode is used as the compensation index; and in yet another optional implement mode, the absolute values of all the clock differences are sorted according to the size, a median of all the clock differences is taken, and the median is used as the compensation index. This embodiment does not make any limit to the implementation mode of the compensation index, and it should be understood that other implementation modes of processing the clock difference, which have the same effect, still fall within the scope of protection of this embodiment.

In this embodiment, after the compensation index is obtained, the compensation index can be used as the time compensation value for the slave to adjust the time so as to realize clock synchronization between the slave and the host.

In this embodiment, the adjusted time of the slave can be obtained using the following formula:

$$C = T_0 + \Delta T(n-1) + \Delta C_{average} + D,$$

wherein C represents the adjusted time of the slave, $T_0$ represents the first packet timestamp, D represents the preset standard delay, $\Delta T$ represents the sending interval, $\Delta C_{average}$ represents the average value of the clock differences of all the valid data packets, and n represents the number of the data packets.

It is worth mentioning that clock synchronization can be carried out on the slave and the host once or for many times, and the frequency can be set according to the actual situation. Therefore, in some optional embodiments, after the time is adjusted according to the time compensation value, the clock synchronization method further comprises:

sending an acknowledgement data packet to the host, so that the host resends a plurality of data packets according to the acknowledgement data packet after a preset duration.

Wherein the acknowledgement data packet refers to a data packet sent by the slave to the host for acknowledging that clock synchronization is completed after clock synchronization between the slave and the host is completed at least once, and the common acknowledgement data packet can comprise an ack data packet. It should be illustrated that after receiving the acknowledgement data packet sent by the slave, the host can resend a plurality of data packets for clock synchronization to the slave after a preset duration, and the preset duration can be 3 minutes or 5 minutes or can be 1 hour or 2 hours, which is not limited by this embodiment. That is to say, clock synchronization between the slave and the host can be carried out for multiple times, and adjustment of the time of the slave is subject to time of last clock synchronization with the host.

According to the clock synchronization method provided by the embodiment of the present invention, after a plurality of data packets sent by the host are received, the receiving time when each data packet is received and the sending interval at which each two adjacent data packets are sent are acquired. The data packet comprises the packet sequence and the first packet timestamp when the first data packet is sent. Screening processing is carried out on all data packets according to the sending interval and the receiving time and packet sequence of each data packet so as to obtain at least one valid data packet. The time compensation value is obtained according to the receiving time of each valid data packet, the first packet timestamp, and the sending interval. The time is adjusted according to the time compensation value so as to realize clock synchronization between the slave and the host. The influence of occasionality of network delay fluctuation on the accuracy of the clock synchronization result is greatly reduced, and the accuracy of clock synchronization is improved.

Figure 9:
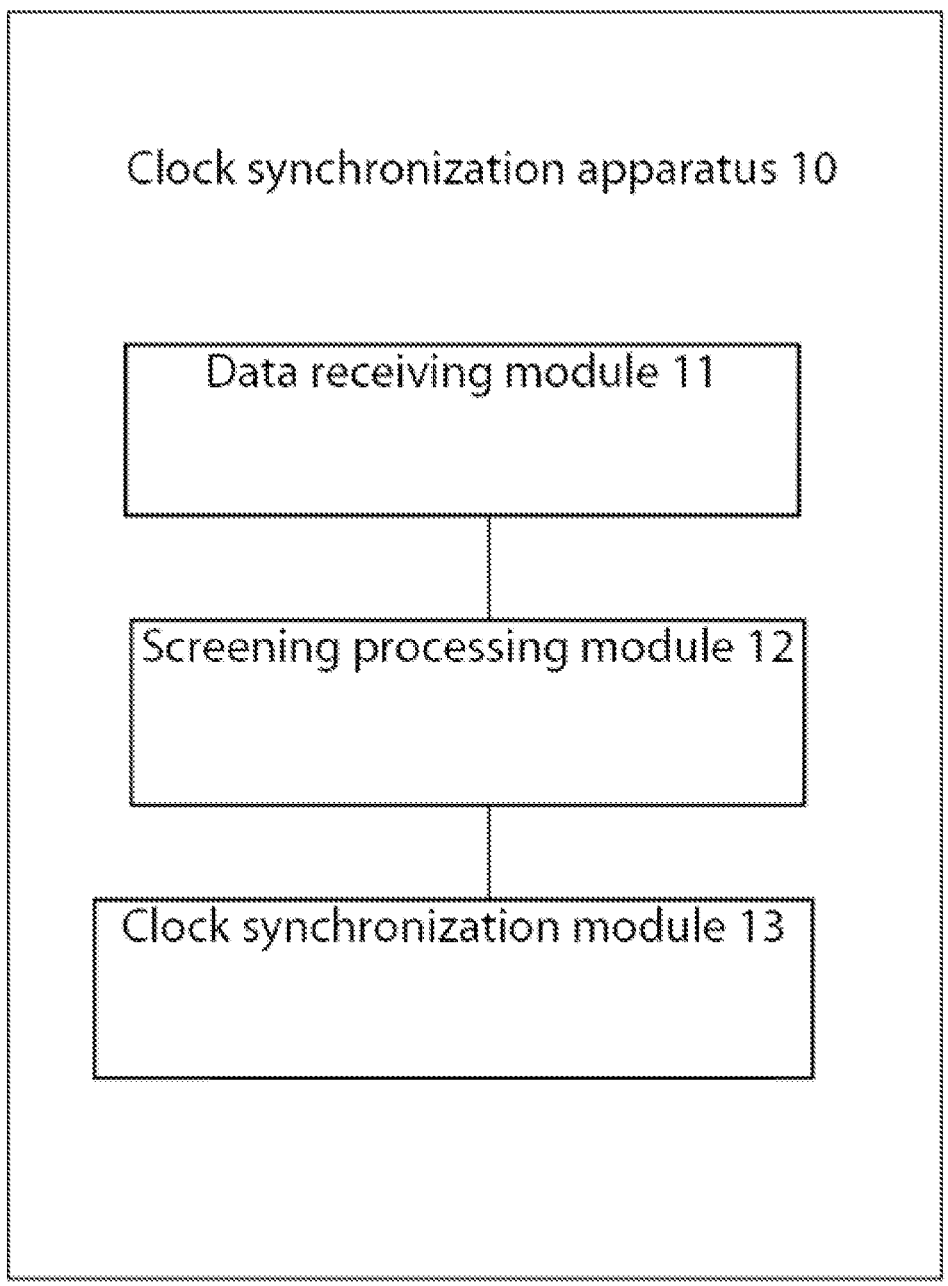
FIG. 9 is a schematic block diagram of a clock synchronization apparatus provided by embodiments of the present invention.

Based on the same inventive concept, in combination with FIG. 9, this embodiment further provides a clock synchronization apparatus 10, comprising: a data receiving module 11, a screening processing module 12, and a clock synchronization module 14.

The data receiving module 11 is used for receiving a plurality of data packets sent by a host and acquiring receiving time when each data packet is received and a sending interval at which each two adjacent data packets are sent. The data packet comprises a packet sequence and a first packet timestamp when the first data packet is sent.

The screening processing module 12 is used for carrying out screening processing on all data packets according to the sending interval and the receiving time and packet sequence of each data packet so as to obtain at least one valid data packet and obtaining a time compensation value according to the first packet timestamp, the sending interval, and the receiving time and packet sequence of each valid data packet.

The clock synchronization module 13 is used for adjusting time of a slave according to the time compensation value so as to realize clock synchronization between the slave and the host.

In an optional implementation mode, the screening processing module 12 is used for:

obtaining a first delay between other data packets and each data packet according to the sending interval and the packet sequence and receiving time of each data packet;

obtaining target data packets in conformity with a preset delay threshold in other data packets according to the first delay; and detecting whether a proportion of the number of the target data packets is greater than a preset proportion threshold, and if yes, setting the data packet as a valid data packet.

In an optional implementation mode, the screening processing module 12 is used for:
obtaining the first delay between other data packets and the data packet by calculation using the following formula according to the sending interval and the packet sequence and receiving time of the data packet:

$$d_i = t_i - t_r - \Delta T(i-1),$$

wherein i represents a packet sequence of the $i^{th}$ data packet, $d_i$ represents a first delay of the data packet with the packet sequence of i, $t_i$ represents receiving time of the data packet with the packet sequence of i, $t_r$ represents receiving time of a data packet with a packet sequence of r, $\Delta T$ represents the sending interval, and the sending interval between any two adjacent data packets is equal.

In an optional implementation mode, the screening processing module 12 is used for:
comparing an absolute value of each first delay with the delay threshold; and
setting a data packet corresponding to the first delay as the target data packet if the absolute value of the first delay is smaller than the delay threshold.

In an optional implementation mode, the screening processing module 12 is used for:
obtaining a clock difference according to the sending interval, the first packet timestamp, and the packet sequence and receiving time of each valid data packet; and
obtaining the time compensation value according to the clock differences of all valid data packets.

In an optional implementation mode, the screening processing module 12 is used for:
obtaining the clock difference by calculation using the following formula according to the sending interval, the first packet timestamp, and the packet sequence and receiving time of the valid data packet, as well as a preset standard delay:

$$\Delta C_i = t_i - \Delta T(i-1) - T_0 - D,$$

wherein i represents the packet sequence of the $i^{th}$ data packet, $\Delta C_i$ represents a clock difference of the data packet with the packet sequence of i, $t_i$ represents the receiving time of the data packet with the packet sequence of i, $T_0$ represents the first packet timestamp, D represents the standard delay, $\Delta T$ represents the sending interval, and the sending interval between any two adjacent data packets is equal.

In an optional implementation mode, the screening processing module 12 is used for:
obtaining a compensation index according to the clock differences of all valid data packets and setting the compensation index as the time compensation value, wherein the compensation index is an average value or a mode of all clock differences.

The screening processing module 12 can also be used for obtaining the adjusted time of the slave after the time of the slave is adjusted so as to realize clock synchronization between the slave and the host.

The adjusted time of the slave is obtained using the following formula:

$$C = T_0 + \Delta T(n-1) + \Delta C_{average} + D,$$

wherein C represents the adjusted time of the slave, $T_0$ represents the first packet timestamp, D represents the preset standard delay, $\Delta T$ represents the sending interval, $\Delta C_{average}$ represents the average value of all clock differences, and n represents the number of the data packets.

In an optional implementation model, the clock synchronization module 13 is used for:
sending an acknowledgement data packet to the host, so that the host resends a plurality of data packets according to the acknowledgement data packet after a preset duration.

According to the clock synchronization apparatus provided by the embodiment of the present invention, after a plurality of data packets sent by the host are received, the receiving time when each data packet is received and the sending interval at which each two adjacent data packets are sent are acquired. The data packet comprises the packet sequence and the first packet timestamp when the first data packet is sent. Screening processing is carried out on all data packets according to the sending interval and the receiving time and packet sequence of each data packet so as to obtain at least one valid data packet. The time compensation value is obtained according to the receiving time of each valid data packet, the first packet timestamp, and the sending interval. The time is adjusted according to the time compensation value so as to realize clock synchronization between the slave and the host. The influence of occasionality of network delay fluctuation on the accuracy of the clock synchronization result is greatly reduced, and the accuracy of clock synchronization is improved.

Those skilled in the art can clearly know that for convenience and conciseness of description, the specific working process of the clock synchronization apparatus described above can refer to the corresponding process in the above-mentioned method, and will not be repeated herein.

In addition, this embodiment further provides a clock synchronization system, comprising:
a host, used for sending a plurality of data packets, wherein the data packet comprises a packet sequence and a first packet timestamp when the first data packet is sent; and
at least one slave, used for receiving the plurality of data packets sent by the host and acquiring receiving time when each data packet is received and a sending interval at which each two adjacent data packets are sent; carrying out screening processing on all data packets according to the sending interval and the receiving time and packet sequence of each data packet so as to obtain at least one valid data packet; obtaining a time compensation value according to the first packet timestamp, the sending interval, and the receiving time and packet sequence of each valid data packet; and adjusting time of the slave according to the time compensation value so as to realize clock synchronization between the slave and the host.

It should be illustrated that those skilled in the art can clearly know that for convenience and conciseness of description, the specific working process of each device in the clock synchronization system described above can refer to the corresponding process in the above-mentioned method, and will not be repeated herein.

On the basis of above, this embodiment provides a readable storage medium storing a computer program, and the computer program, when being executed by a processor, implements the clock synchronization method according to any one of the above-mentioned implementation modes.

Those skilled in the art can clearly know that for convenience and conciseness of description, the specific working process of the readable storage medium described above can refer to the corresponding process in the above-mentioned method, and will not be repeated herein.

In conclusion, according to the clock synchronization method and apparatus, the electronic device, and the readable storage medium provided by the embodiments of the present invention, after a plurality of data packets sent by the host are received, the receiving time when each data packet is received and the sending interval at which each two adjacent data packets are sent are acquired. The data packet comprises the packet sequence and the first packet timestamp when the first data packet is sent. Screening processing is carried out on all data packets according to the sending interval and the receiving time and packet sequence of each data packet so as to obtain at least one valid data packet. The time compensation value is obtained according to the receiving time of each valid data packet, the first packet timestamp, and the sending interval. The time of the slave is adjusted according to the time compensation value so as to realize clock synchronization between the slave and the host. The influence of occasionality of network delay fluctuation on the accuracy of the clock synchronization result is greatly reduced, and the accuracy of clock synchronization is improved.

The above implementation modes are merely various implementation modes of the present invention, but the scope of protection of the present invention is not limited thereto; and those skilled in the art can easily think of variations or replacements in the technical scope disclosed by the present invention, which all shall fall within the scope of protection of the present invention. Therefore, the scope of protection of the present invention should be determined by the scope of protection of the claims.

The invention claimed is:

1. A clock synchronization method, characterized by comprising:
   receiving a plurality of data packets sent by a host and acquiring receiving time when each data packet is received and a sending interval at which each two adjacent data packets are sent, wherein each data packet comprises a packet sequence number and a first packet timestamp when the first data packet is sent;
   carrying out screening processing on all data packets according to the sending interval, the receiving time and the packet sequence number of each data packet so as to obtain at least one valid data packet;
   obtaining a time compensation value according to the first packet timestamp, the sending interval, the receiving time and packet sequence number of each valid data packet; and
   adjusting time of a slave according to the time compensation value so as to realize clock synchronization between the slave and the host.

2. The clock synchronization method according to claim 1, characterized in that the step of carrying out screening processing on all data packets according to the sending interval, the receiving time and the packet sequence number of each data packet so as to obtain the at least one valid data packet comprises:
   obtaining a first delay between other data packets and each data packet according to the sending interval, the packet sequence number and the receiving time of the data packet;
   obtaining target data packets in conformity with a preset delay threshold in other data packets according to the first delay; and
   detecting whether a proportion of a number of the target data packets is greater than a preset proportion threshold, and if yes, setting the data packet as a valid data packet.

3. The clock synchronization method according to claim 2, characterized in that the step of obtaining the first delay between other data packets and each data packet according to the sending interval, the packet sequence number and the receiving time of the data packet comprises:
   obtaining the first delay between other data packets and the data packet by calculation using the following formula according to the sending interval, the packet sequence number and the receiving time of the data packet:

$$d_i = t_i - t_r - \Delta T(i-1),$$

wherein i represents a packet sequence number of a $i^{th}$ data packet, $d_i$ represents a first delay of the data packet with the packet sequence number of i, $t_i$ represents receiving time of the data packet with the packet sequence number of i, $t_r$ represents receiving time of a data packet with a packet sequence number of r, $\Delta T$ represents the sending interval, and the sending interval between any two adjacent data packets is equal.

4. The clock synchronization method according to claim 2, characterized in that the step of obtaining the target data packets in conformity with a preset delay threshold in other data packets according to the first delay comprises:
   comparing an absolute value of each first delay with the delay threshold; and
   setting a data packet corresponding to the first delay as the target data packet if the absolute value of the first delay is smaller than the delay threshold.

5. The clock synchronization method according to claim 1, characterized in that the step of obtaining the time compensation value according to the first packet timestamp, the sending interval, the receiving time and packet sequence number of each valid data packet comprises:
   obtaining a clock difference according to the first packet timestamp, the sending interval, the receiving time and packet sequence number of each valid data packet; and
   obtaining the time compensation value according to the clock differences of all valid data packets.

6. The clock synchronization method according to claim 5, characterized in that the step of obtaining the clock difference according to the first packet timestamp, the sending interval, the receiving time and packet sequence number of each valid data packet comprises:
   obtaining the clock difference by calculation using the following formula according to the sending interval, the first packet timestamp, the packet sequence number and receiving time of the valid data packet:

$$\Delta C_i = t_i - \Delta T(i-1) - T_0 - D.$$

wherein i represents the packet sequence number of a $i^{th}$ data packet, $\Delta C_i$ represents a clock difference of the data packet with the packet sequence number of i, $t_i$ represents the receiving time of the data packet with the packet sequence number of i, $T_o$ represents the first packet timestamp, D represents a preset standard delay, $\Delta T$ represents the sending interval, and the sending interval between any two adjacent data packets is equal.

7. The clock synchronization method according to claim 5, characterized in that the step of obtaining the time compensation value according to the clock differences of all valid data packets comprises:

obtaining a compensation index according to the clock differences of all the valid data packets and setting the compensation index as the time compensation value, wherein the compensation index is an average value of all clock differences.

8. The clock synchronization method according to claim 5, characterized in that after time of the slave is adjusted, adjusted time of the slave is obtained so as to realize clock synchronization between the slave and the host;

the adjusted time of the slave is obtained using the following formula:

$$C=T_0+\Delta T(n-1)+\Delta C_{average}+D,$$

wherein C represents the adjusted time of the slave, $T_0$ represents the first packet timestamp, D represents a preset standard delay, $\Delta T$ represents the sending interval, $\Delta C_{average}$ represents an average value of all clock differences, and n represents a number of the data packets.

9. The clock synchronization method according to claim 1, characterized in that after adjusting time according to the time compensation value, the method further comprises:

sending an acknowledgement data packet to the host, so that the host resends a plurality of data packets according to the acknowledgement data packet after a preset duration.

10. A clock synchronization apparatus, characterized by comprising:

a data receiving module, used for receiving a plurality of data packets sent by a host and acquiring receiving time when each data packet is received and a sending interval at which each two adjacent data packets are sent, wherein each data packet comprises a packet sequence number and a first packet timestamp when the first data packet is sent;

a screening processing module, used for carrying out screening processing on all data packets according to the sending interval, the receiving time and the packet sequence number of each data packet so as to obtain at least one valid data packet and obtaining a time compensation value according to the first packet timestamp, the sending interval, the receiving time and packet sequence of each valid data packet; and a clock synchronization module, used for adjusting time of a slave according to the time compensation value so as to realize clock synchronization between the slave and the host.

11. An electronic device, characterized by comprising: a memory, a processor, and a computer program stored in the memory and capable of running on the processor, wherein the processor, when executing the computer program, implements a clock synchronization method, wherein the clock synchronization method comprises the steps as follows:

receiving a plurality of data packets sent by a host and acquiring receiving time when each data packet is received and a sending interval at which each two adjacent data packets are sent, wherein each data packet comprises a packet sequence number and a first packet timestamp when the first data packet is sent;

carrying out screening processing on all data packets according to the sending interval, the receiving time and the packet sequence number of each data packet so as to obtain at least one valid data packet;

obtaining a time compensation value according to the first packet timestamp, the sending interval, the receiving time and packet sequence number of each valid data packet;

and adjusting time of a slave according to the time compensation value so as to realize clock synchronization between the slave and the host.

12. The electronic device according to claim 11, characterized in that the step of carrying out screening processing on all data packets according to the sending interval, the receiving time and the packet sequence number of each data packet so as to obtain the at least one valid data packet comprises:

obtaining a first delay between other data packets and each data packet according to the sending interval, the packet sequence number and the receiving time of the data packet;

obtaining target data packets in conformity with a preset delay threshold in other data packets according to the first delay; and detecting whether a proportion of a number of the target data packets is greater than a preset proportion threshold, and if yes, setting the data packet as a valid data packet.

13. The electronic device according to claim 12, characterized in that the step of obtaining the first delay between other data packets and each data packet according to the sending interval, the packet sequence number and the receiving time of the data packet comprises:

obtaining the first delay between other data packets and the data packet by calculation using the following formula according to the sending interval, the packet sequence number and the receiving time of the data packet:

$$d_i=t_i-t_r-\Delta T(i-1),$$

wherein i represents a packet sequence number of a $i^{th}$ data packet, $d_i$ represents a first delay of the data packet with the packet sequence number of i, $t_i$ represents receiving time of the data packet with the packet sequence number of i, $t_r$ represents receiving time of a data packet with a packet sequence number of r, $\Delta T$ represents the sending interval, and the sending interval between any two adjacent data packets is equal.

14. The electronic device according to claim 12, characterized in that the step of obtaining the target data packets in conformity with a preset delay threshold in other data packets according to the first delay comprises:

comparing an absolute value of each first delay with the delay threshold; and setting a data packet corresponding to the first delay as the target data packet if the absolute value of the first delay is smaller than the delay threshold.

15. The electronic device according to claim 11, characterized in that the step of obtaining the time compensation value according to the first packet timestamp, the sending interval, the receiving time and packet sequence number of each valid data packet comprises:

obtaining a clock difference according to the first packet timestamp, the sending interval, the receiving time and packet sequence number of each valid data packet; and obtaining the time compensation value according to the clock differences of all valid data packets.

16. The electronic device according to claim 15, characterized in that the step of obtaining the clock difference according to the first packet timestamp, the sending interval, the receiving time and packet sequence number of each valid data packet comprises:

obtaining the clock difference by calculation using the following formula according to the sending interval, the first packet timestamp, the packet sequence number and receiving time of the valid data packet:

$$\Delta C_i = t_i - \Delta T(i-1) - T_0 - D,$$

wherein i represents the packet sequence of a $i^{th}$ data packet, $\Delta C_i$ represents a clock difference of the data packet with the packet sequence number of i, $t_i$ represents the receiving time of the data packet with the packet sequence number of i, $T_o$ represents the first packet timestamp, D represents a preset standard delay, $\Delta T$ represents the sending interval, and the sending interval between any two adjacent data packets is equal.

17. The electronic device according to claim 15, characterized in that the step of obtaining the time compensation value according to the clock differences of all valid data packets comprises:

obtaining a compensation index according to the clock differences of all the valid data packets and setting the compensation index as the time compensation value, wherein the compensation index is an average value of all clock differences.

18. The electronic device according to claim 15, characterized in that after time of the slave is adjusted, adjusted time of the slave is obtained so as to realize clock synchronization between the slave and the host;

the adjusted time of the slave is obtained using the following formula:

$$C = T_0 + \Delta T(n-1) + \Delta C_{average} + D,$$

wherein C represents the adjusted time of the slave, $T_0$ represents the first packet timestamp, D represents a preset standard delay, $\Delta T$ represents the sending interval, $\Delta C_{average}$ represents an average value of all clock differences, and n represents a number of the data packets.

19. The electronic device according to claim 11, characterized in that after adjusting time according to the time compensation value, the method further comprises:

sending an acknowledgement data packet to the host, so that the host resends a plurality of data packets according to the acknowledgement data packet after a preset duration.

\* \* \* \* \*